ELECTROLUMINESCENT DEVICE

Filed Dec. 14, 1959 2 Sheets-Sheet 1

INVENTOR
EDWIN R. BOWERMAN JR.
BY
Theodore Jay Jr.
ATTORNEY

April 23, 1963 E. R. BOWERMAN, JR 3,087,068

ELECTROLUMINESCENT DEVICE

Filed Dec. 14, 1959 2 Sheets-Sheet 2

INVENTOR
EDWIN R. BOWERMAN JR.
BY [signature]
ATTORNEY

1

3,087,068
ELECTROLUMINESCENT DEVICE

Edwin R. Bowerman, Jr., Whitestone, N.Y., assignor to Sylvania Electric Products Inc., a corporation of Delaware Filed Dec. 14, 1959, Ser. No. 859,247
1 Claim. (Cl. 250—209)

My invention relates to electroluminescent devices.

I have invented a new type of bistable electroluminescent device having two mutually exclusive states as defined by the dark or lit condition of two electroluminescent cells. More particularly, when my device is in one state, one of these cells is lit while the other cell is dark. When my device is in its other state, the relative positions of the dark and lit cells are interchanged. My device is triggered alternatively from one to another of its states by successive incoming electrical pulses.

Accordingly, it is an object of my invention to provide a new and improved electroluminescent device of the character indicated.

Another object is to provide a new and improved bistable electroluminescent device which, in response to successive incoming pulses in a single pulse train, is alternately triggered into one or the other of its two mutually exclusive states.

Still another object is to incorporate a plurality of my bistable devices into a single unit having four or more mutually exclusive states, this unit being adapted for use as a scaler or as a pulse counter.

These and other objects of my invention will either be explained or will become apparent hereinafter.

In accordance with the principles of my invention, I provide first, second, third and fourth photoconductive cells and first, second, third and fourth electroluminescent cells.

In one embodiment of my invention, the third and fourth electroluminescent cells are connected in series between first and second terminals. The third and fourth photoconductive cells are also connected in series between the first and second terminals, the junction of the third and fourth photoconductive cells being coupled to the junction of the third and fourth electroluminescent cells. The third and fourth photoconductive cells are optically coupled to the fourth and third electroluminescent cells respectively.

The first photoconductive cell and the first electroluminescent cell are connected in series between the second terminal and a third terminal. The second photoconductive cell and the second electroluminescent cell are also connected in series between the second and the third terminals. The first and second photoconductive cells are optically coupled to the third and fourth electroluminescent cells respectively. The third and fourth photoconductive cells are optically coupled to the first and second electroluminescent cells respectively (as well as being optically coupled to the fourth and third electroluminescent cells as explained above).

When the first and second terminals are connected to a suitable power supply, the device will be in one of its states, as indicated both by the dark or lit condition of one of the third and fourth electroluminescent cells and by the lit or dark condition of the other of these cells. Then, when a first voltage pulse is applied between the second and third terminals, the relative positions of the dark and lit cells will be reversed. Upon the arrival of a second voltage pulse, these relative positions will again be reversed, thus providing the desired bistable action.

The structure of the above device can be modified by interchanging the positions of the second photoconductive cell and the first electroluminescent cell. Then, providing

2 that the first and second photoconductive cells are optically coupled to the second and first electroluminescent cells respectively (as well as being optically coupled to the third and fourth electroluminescent cells as explained above), and the junction of the first and second electroluminescent cells is coupled to the junction of the first and second photoconductive cells, the modified device can be operated to provide bistable action in the same manner as described above.

Alternatively, the four photoconductive cells and four electroluminescent cells can be arranged in a ring-like formation wherein each photoconductive cell is positioned between (and optically coupled to) two adjacent electroluminescent cells and wherein each electroluminescent cell is positioned between two adjacent photoconductive cells. As will be explained in more detail hereinafter, this ring-like structure can also function in the same manner as the electroluminescent-photoconductive structures described above.

Illustrative embodiments of my invention will now be described with reference to the accompanying drawings wherein.

Figure 1:
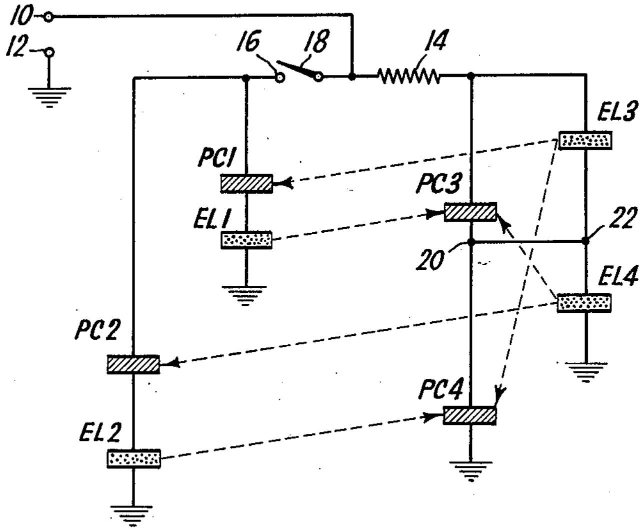
FIG. 1 illustrates an embodiment of my invention.

Referring now to FIG. 1, a first photoconductive cell PC1 and an electroluminescent cell EL1 are connected in series between terminal 16 and ground to terminal 12. Similarly, a second photoconductive cell PC2 and a second electroluminescent cell EL2 are connected in series between terminal 16 and ground.

A circuit comprising a resistor 14, a third photoconductive cell PC3 and a fourth photoconductive cell PC4, a third electroluminescent cell EL3 and a fourth electroluminescent cell EL4 are connected in series between resistor 14 and ground. The junction 20 of the photoconductor cells PC3 and PC4 is connected to the junction 22 of electroluminescent cells EL3 and EL4. Terminal 10 is connected through switch 18 to terminal 16.

As shown by the dotted lines, cell EL3 is optically coupled to cells PC1 and PC4. Similarly, EL4 is optically coupled to cells PC2 and PC3. Cell EL1 is optically coupled to cell PC3 and cell EL2 is optically coupled to cell PC4.

This device works in the following manner: A suitable operating voltage, for example a 300 volt 3000 cycles per second voltage, is applied between terminals 10 and 12. With switch 18 open, one of cells EL3 and EL4 is lit and the other of these cells is dark. Assuming that cell EL3 is lit, the light thus emitted triggers cell PC4 into its low impedance state. Consequently, cell EL4 is short-circuited and dark.

Cell PC1 is in its low impedance state due to the light emitted from the cell EL3. When switch 18 is momentarily closed, cell EL1 is momentarily energized and emits a light pulse. (Since cell PC2 is not illuminated, its impedance is high, and cell EL2 remains dark.)

However, the light pulse strikes cell PC3 and triggers PC3 into its low impedance state. Consequently, cell EL3 is short-circuited and dark. At the same time, however, the voltage applied across the terminals 10 and 12 (due to the low impedance of PC3) is sufficient to light cell EL4. The light emitted from cell EL4 then impinges upon cell PC3 and maintains it in its low impedance state.

Then, when switch 18 is opened, cell EL1 is extinguished but cell EL4 remains lit and cell EL3 remains dark.

When switch 18 is again closed momentarily, it will be seen that cell EL4 is then extinguished and cell EL3 is lit.

Figure 2:
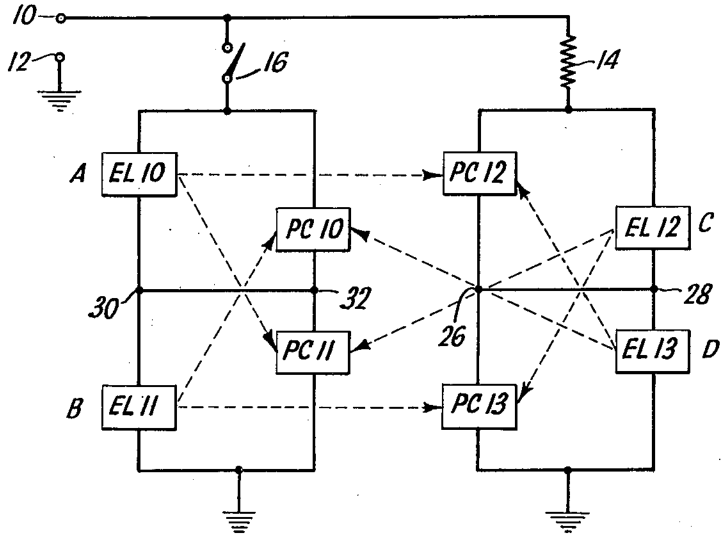
FIG. 2 illustrates a second embodiment.

Referring now to FIG. 2, electroluminescent cells EL12 and EL13 are connected in series between resistor 14 and ground. Similarly, photoconductive cells PC12 and PC13 are connected in series between resistor 14 and ground. Electroluminescent cells EL10 and EL11 are connected in series between terminal 16 and ground, and photoconductive cells PC10 and PC11 also are connected in series between terminal 16 and ground.

The junction 26 of cells PC12 and PC13 is connected to the junction 28 of cells EL12 and EL13. The junction 30 of cells EL10 and EL12 is connected to the junction 32 of cells PC10 and PC11. Cell PC11 is optically coupled to cells EL10 and EL12. Cell PC10 is optically coupled to cells EL11 and EL13. Cell PC12 is optically coupled to cells EL10 and EL13. Cell PC13 is optically coupled to cells EL11 and EL12.

When, in the device of FIG. 2, a suitable operating voltage is applied between terminals 10 and 12 and switch 16 is momentarily closed, this device will work in the same manner as that of FIG. 1, with cells EL12 and EL13 acting in the same manner as electroluminescent cells EL3 and EL4 in FIG. 1.

Figure 3:
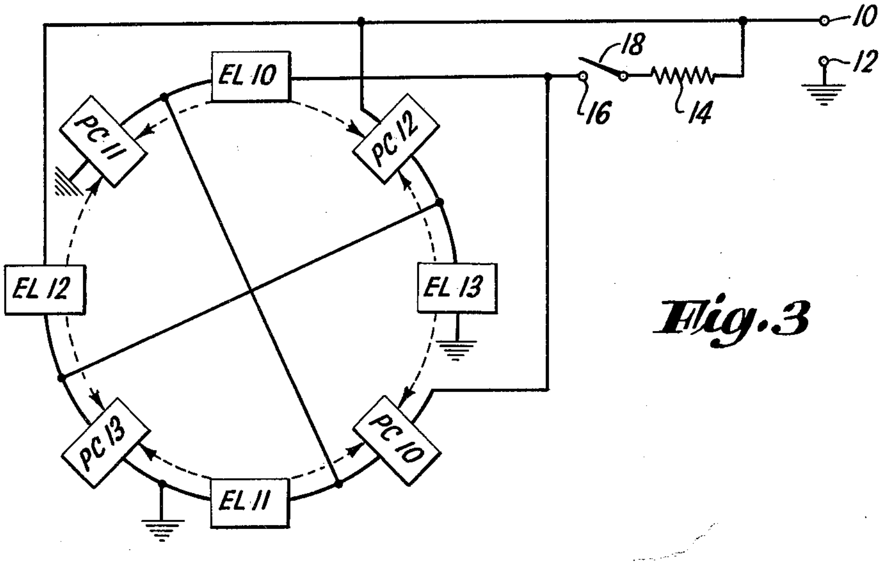
FIG. 3 illustrates a third embodiment.

FIG. 3 shows an arrangement electrically equivalent to the device of FIG. 2, but wherein the various cells are arranged into a ring in which each photoconductive cell is placed between two adjacent electroluminescent cells and is optically coupled thereto, and further, in which each electroluminescent cell is positioned between two adjacent photoconductive cells.

As will be apparent from the preceding description, each of the devices of FIGS. 1, 2 and 3 has two mutually exclusive states as indicated by the relative dark and lit states of two electroluminescent cells. By momentarily closing switch 18, successive voltage pulses can be supplied to the device to trigger the device from one state to the other.

Figure 4:
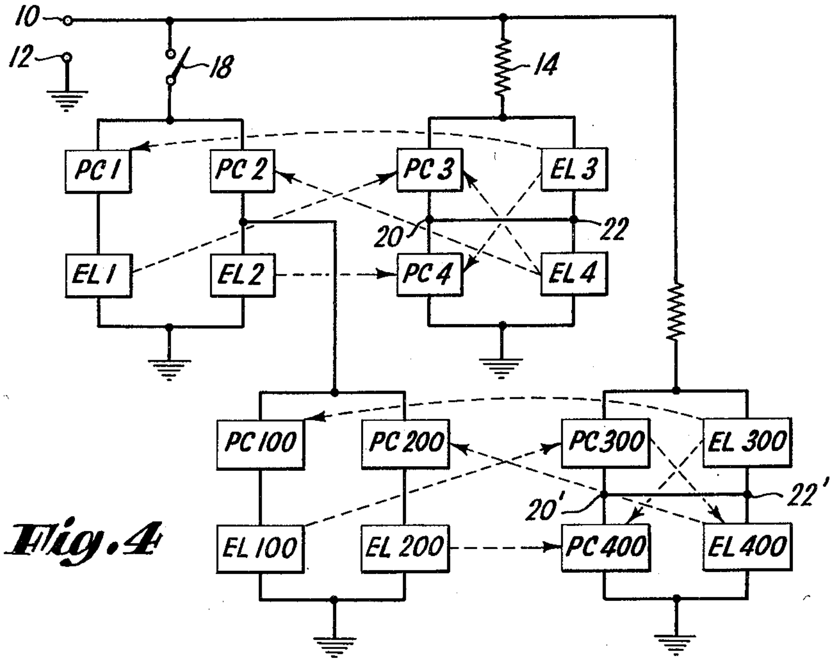

FIG. 4 shows an arrangement wherein two of the devices shown in FIG. 1 are cascaded to produce a counter having, in this example, four mutually exclusive states. The output to the second device is supplied from the junction of cell PC2 and cell EL2 in the first device. In the first state, cells EL3 and EL300 are lit and cells EL4 and EL400 are dark. In the second state, cells EL4 and EL300 are lit while cells EL3 and EL400 are dark. In the third state, cells EL3 and EL400 are lit while cells EL4 and EL300 are dark. In the fourth state, cells EL4 and EL400 are lit while cells EL3 and EL300 are dark. Each time switch 18 is momentarily closed then opened, the state of the arrangement of FIG. 4 changes; this arrangement returns to its original state after the switch has been momentarily closed then opened for the fourth line.

Figure 5:
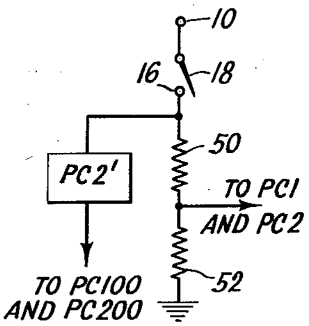
FIGS. 4 and 5 illustrate alternative methods for cascading two or more of the devices shown in the preceding figures.

An alternative connection for coupling together the two electroluminescent devices of FIG. 4 is shown in FIG. 5.

The various resistors shown in FIGS. 1–4 are useful for preventing power supply overloads, but, if necessary, any of these embodiments can be operated without these resistors.

What is claimed is:

An electroluminescent device comprising first, second, third and fourth photoconductive cells, and first, second, third and fourth electroluminescent cells, said first photoconductive cell being optically coupled to said second and fourth electroluminescent cells, said second photoconductive cell being optically coupled to said first and third electroluminescent cells, said third photoconductive cell being optically coupled to said first and fourth electroluminescent cells, said fourth photoconductive cell being optically coupled to said second and third electroluminescent cells, said third and fourth photoconductive cells being connected in series between first and second terminals, said third and fourth electroluminescent cells being connected in series between said first and second termials, the junction of said third and fourth photoconductive cells being coupled to the junction of said third and fourth electroluminescent cells; said first and second photoconductive cells being connected in series between said second terminal and a third terminal, said first and second electroluminescent cells being connected in series between said second and third terminals, the junction of said first and second electroluminescent cells being coupled to the junction of said first and second photoconductive cells.

References Cited in the file of this patent

UNITED STATES PATENTS

| | | |
|---|---|---|
| 2,947,874 | Tomlinson | Aug. 2, 1960 |
| 2,997,596 | Vize | Aug. 22, 1961 |

OTHER REFERENCES

Opto-Electronic Devices and Networks, Laebner, Proceedings of I.R.E., December 1955, pages 1897–1906.